United States Patent
Vasudevan et al.

(12)
(10) Patent No.: US 9,072,027 B2
(45) Date of Patent: Jun. 30, 2015

(54) METHODS AND APPARATUSES FOR FACILITATING D2D BEARER SWITCHING

(71) Applicant: Alcatel-Lucent USA Inc., Murray Hill, NJ (US)

(72) Inventors: Subramanian Vasudevan, Morristown, NJ (US); Jialin Zou, Randolph, NJ (US); Sudeep Palat, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 61 days.

(21) Appl. No.: 13/708,336

(22) Filed: Dec. 7, 2012

(65) Prior Publication Data

US 2014/0160950 A1    Jun. 12, 2014

(51) Int. Cl.
| | |
|---|---|
| *H04J 1/16* | (2006.01) |
| *H04W 4/00* | (2009.01) |
| *H04J 3/16* | (2006.01) |
| *H04M 3/00* | (2006.01) |
| *H04W 40/02* | (2009.01) |
| *H04W 76/04* | (2009.01) |
| *H04W 36/00* | (2009.01) |
| *H04W 40/12* | (2009.01) |
| *H04W 36/02* | (2009.01) |
| *H04W 76/02* | (2009.01) |

(52) U.S. Cl.
CPC .............. *H04W 40/02* (2013.01); *H04W 40/12* (2013.01); *H04W 36/023* (2013.01); *H04W 76/023* (2013.01); *H04W 76/043* (2013.01); *H04W 36/00* (2013.01)

(58) Field of Classification Search
CPC ...................................................... H04L 47/10
USPC ................... 370/252, 466; 455/418
See application file for complete search history.

(56) References Cited

U.S. PATENT DOCUMENTS

| | | | |
|---|---|---|---|
| 2009/0003378 A1 * | 1/2009 | Sachs | 370/466 |
| 2010/0177736 A1 | 7/2010 | Wang et al. | |

(Continued)

FOREIGN PATENT DOCUMENTS

WO    WO-2012/079621 A1    6/2012

OTHER PUBLICATIONS

Invitation to Pay Additional Fees with attached Partial Search Report, issued Apr. 17, 2014 in International Application No. PCT/US2013/071141.
NTT DoCoMo, Inc. "PDCP SN continuation for DL Data Forwarding during handover"3GPP TSG-RAN3#57 Aug. 20-24, 2007 Athens, Greece.
International Search Report for International Application No. PCT/US2013/071141 dated May 23, 2014.

(Continued)

*Primary Examiner* — Kiet G Tang
(74) *Attorney, Agent, or Firm* — Harness, Dickey & Pierce, P.L.C.

(57) ABSTRACT

A method of facilitating path switching, for a communication path between a first user equipment (UE) and a second UE, from a device to device (D2D) path to network path, includes receiving switch point information from the first UE that identifies a data block; establishing, at the access network, a connection with the first UE over an uplink path between the first UE and the access network; establishing, at the access network, a connection with the second UE over a downlink path between the network element and the second UE; setting, at the access network, a data block sequencing numbering to be the same for the uplink path and the downlink path based on the switch point information; and forwarding, at the access network, data from the first UE to the second UE via the network path, the network path including the uplink path and the downlink path.

20 Claims, 7 Drawing Sheets

(56) References Cited

U.S. PATENT DOCUMENTS

2010/0279672 A1*  11/2010  Koskela et al. ............... 455/418
2013/0254277 A1    9/2013  Vasudevan et al.
2014/0004796 A1    1/2014  Cakulev et al.

OTHER PUBLICATIONS

Written Opinion of the International Searching Authority for International Application No. PCT/US2013/071141 dated May 23, 2014.

* cited by examiner

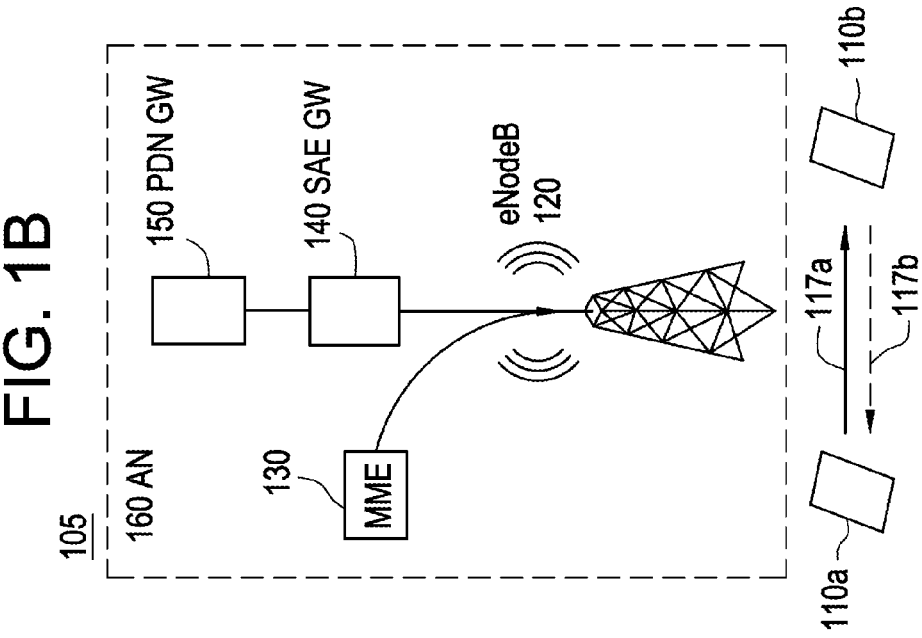
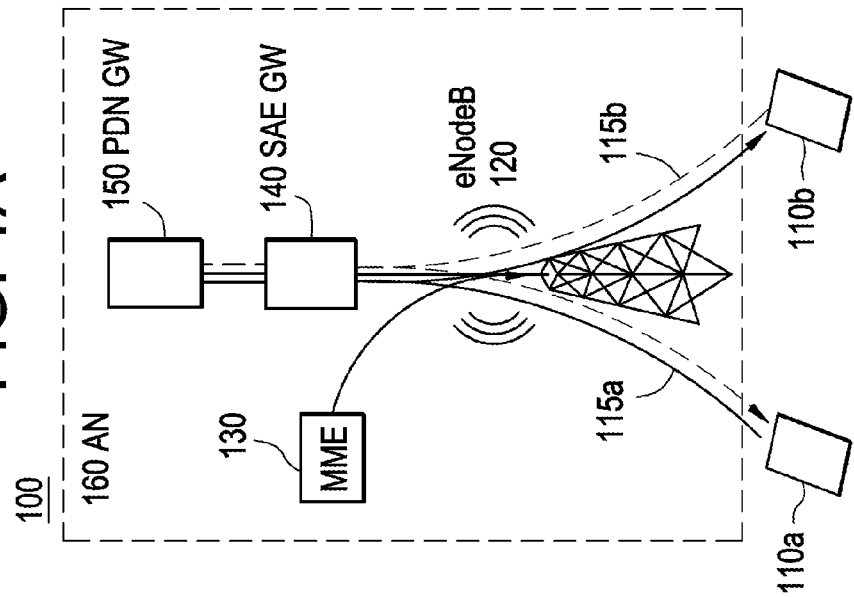

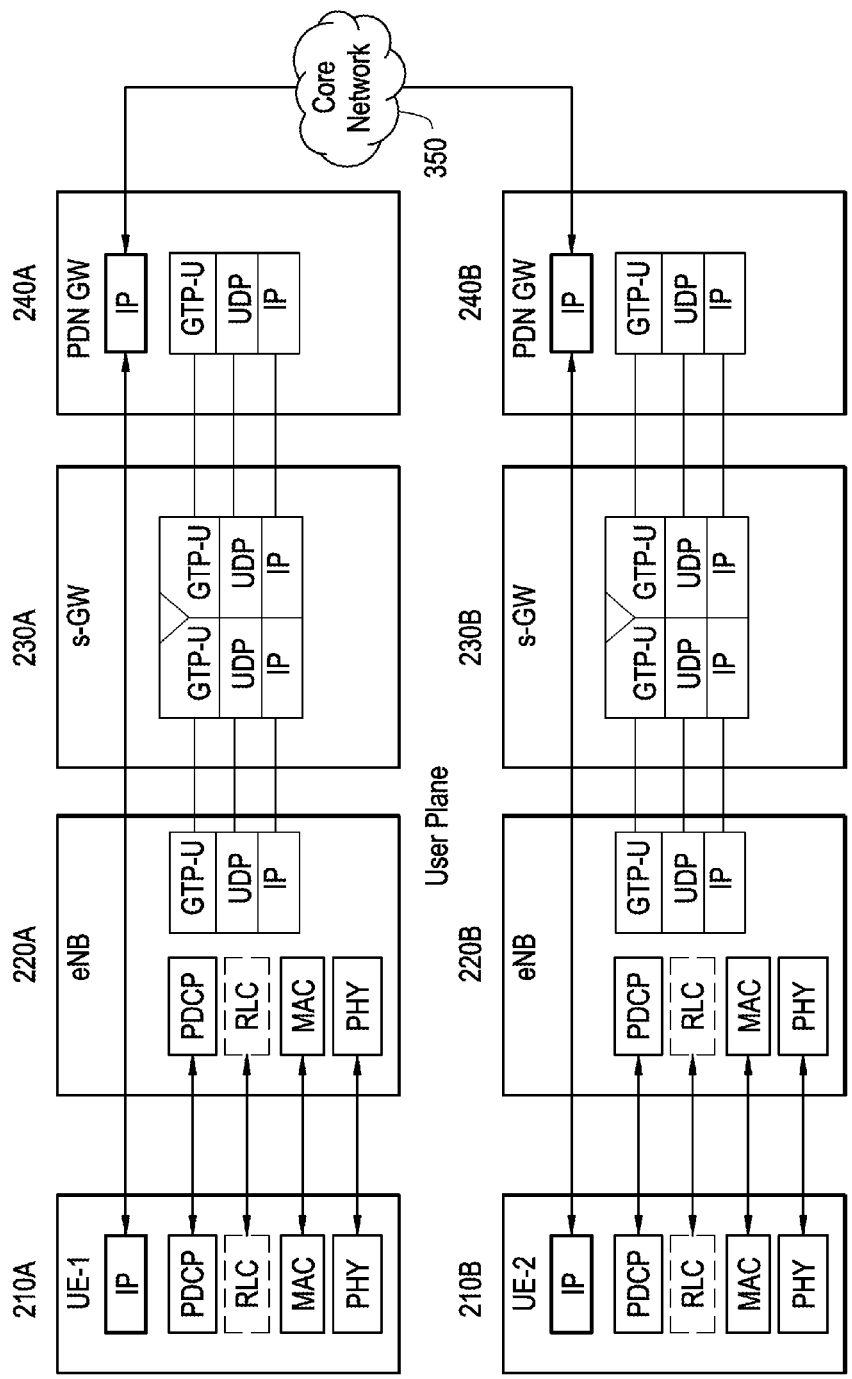

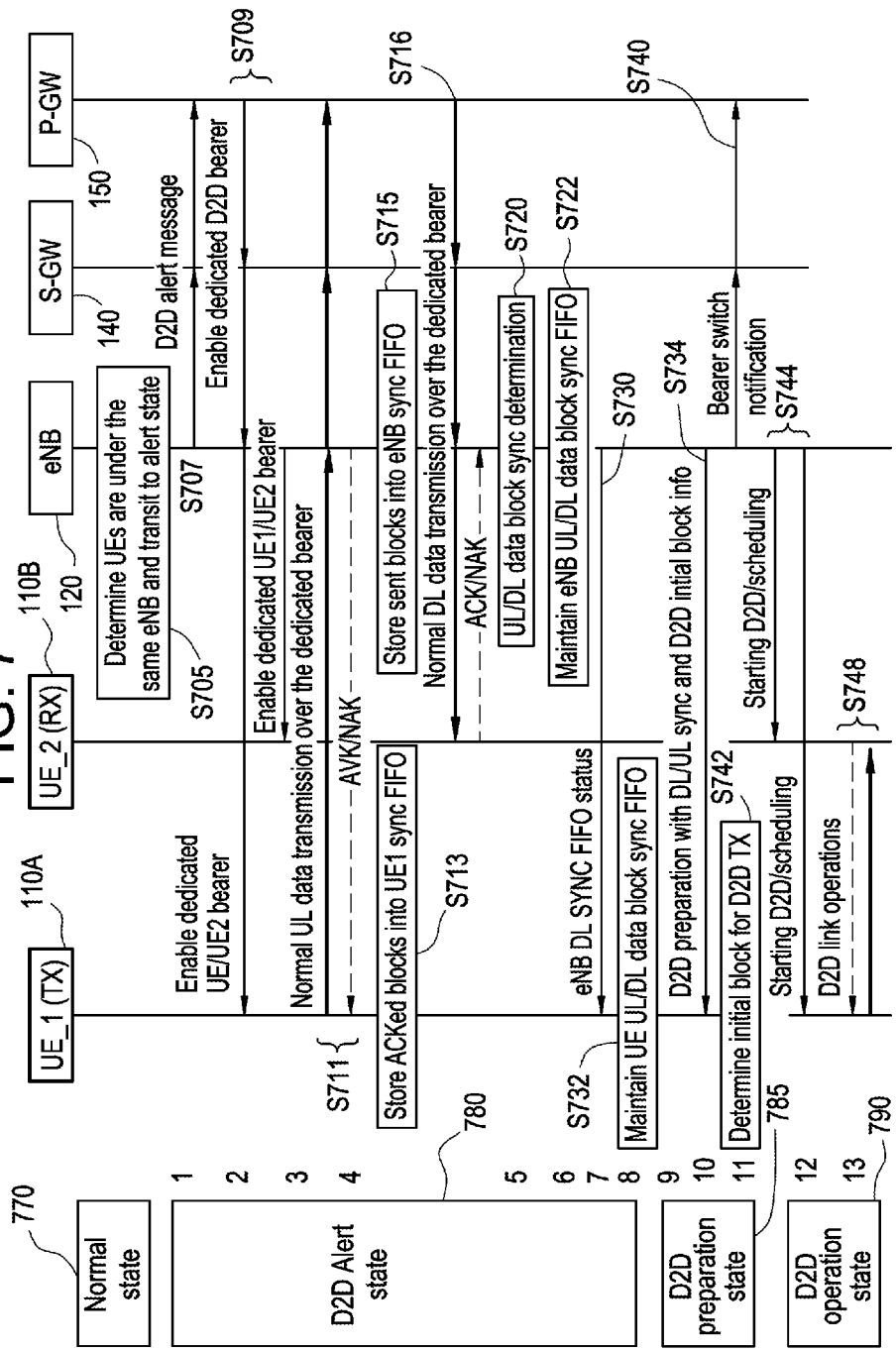

METHODS AND APPARATUSES FOR FACILITATING D2D BEARER SWITCHING

BACKGROUND

1. Field

Example embodiments relate generally to device to device (D2D) communication between UEs in a wireless communications network.

2. Related Art

In traditional wireless networks, all data being sent from and received by UEs typically travels through a core network (CN). In device to device communications, UEs communicate with each other, directly. Device to device communication may be used for at least public safety, data off-load, and social networking.

To improve public safety, device to device communication is used where the cellular infrastructure is unavailable. Device to device communication allows UEs to communicate with each other directly in emergency situations.

Device to device communication can be used by the serving wireless system to off-load the data from the core network when it is exchanged between proximate UEs.

At the air interface, the normal communication path through the network and the device to device path could use the same radio access technology or different radio access technologies.

SUMMARY

According to at least one example embodiment, a method of facilitating path switching, for a communication path between a first user equipment (UE) and a second UE, from a device to device (D2D) path to network path includes receiving, at the access network, switch point information from the first UE, the switch point information identifying a data block that has been sent from the first UE to the second UE over the D2D path; establishing, at the access network, a connection with the first UE over an uplink path between the first UE and the access network; establishing, at the access network, a connection with the second UE over a downlink path between the network element and the second UE; setting, at the access network, a data block sequencing numbering to be the same for the uplink path and the downlink path based on the switch point information; and forwarding, at the access network, data from the first UE to the second UE via the network path, the network path including the uplink path and the downlink path.

According to at least one example embodiment, the method may further include receiving, at the access network, a lost data message from the second UE identifying data blocks which the second UE has determined were lost in transmission over the D2D path between the first UE and the second UE; sending, from the access network, a data retrieval message to the first UE, the data retrieval message instructing the first UE to forward the data blocks identified as being lost to the access network; receiving, from the first UE, the data blocks identified as being lost; and sending the data blocks identified as being lost from the access network to the second UE over the downlink path.

According to at least one example embodiment, the method may further include determining, at the access network; a signal quality of transmission between the first UE and the second UE on the D2D path; and sending a message to the first UE instructing the first UE to stop data transmission to the second UE over the D2D path based on the determined signal quality.

According to at least one example embodiment, a method of performing path switching, for a communication path between a first user equipment (UE) and a second UE, from a device to device (D2D) path to network path, may include receiving, at the first UE, a first message from an access network; stopping, at the first UE, data transmission to the second UE through the D2D path, in response to the first message; determining a last data block sent from the first UE to the second UE based on contents of a transmission buffer at the first UE; sending, from the first UE, switch point information to the access network, the switch point information identifying the last data block; establishing, at the first UE, a connection with the access network over an uplink path between the first UE and the access network; and sending data from the first UE to the second UE over the network path, the network path including the uplink path to the access network.

According to at least one example embodiment, a method of facilitating path switching, for a communication path between a first user equipment (UE) and a second UE, from a network path to a device to device (D2D) path, may include receiving, at the access network, a stream of uplink data blocks sent from the first UE to the second UE on an uplink path between the first UE and the access network; storing, in a buffer at the access network, data blocks from the stream of uplink data blocks; sending, from the access network, a stream of downlink data blocks on a downlink path between the access network and the second UE, the stream of downlink data blocks being blocks sent from the first UE to the second UE; determining, at the access network, whether the stream of uplink blocks is synchronized with the stream of downlink blocks based on an oldest data block stored in the buffer which has not yet been received at the second UE and a data block from the stream of downlink data blocks; and based on the determination, sending a D2D preparation message from the access network to the first UE, the D2D preparation message identifying an initial data block for the first UE to send over the D2D path.

According to at least one example embodiment the D2D preparation message further includes a sequencing numbering indication indicating a data block sequencing numbering used by the access network for the stream of downlink data blocks sent on the downlink path.

According to at least one example embodiment the method may further include before sending the D2D preparation message, establishing, at the access network, at least one dedicated data bearer for at least one stream of uplink data blocks received from the first UE on the uplink path and the stream of downlink data blocks sent to the second UE on the downlink path, the at least one dedicated data bearer separating the stream of uplink data blocks and the stream of downlink data blocks out from data blocks of other streams being sent from the first UE or received at the second UE.

According to at least one example embodiment, a method of performing path switching, for a communication path between a first user equipment (UE) and a second UE, from a network path to a device to device (D2D) path, may include sending, from the first UE, a stream of uplink data blocks to the second UE through an uplink path from the first UE to an access network; receiving, at the first UE, a first message from the access network; storing, in a buffer at the first UE, copies of blocks from the stream of uplink data which have been acknowledged by the access network as being received, in response to the first message; receiving, at the mobile device, a synchronization buffer status message from the access network; synchronizing the buffer at the mobile device with a UL/DL synchronization buffer at the access network by removing the old data blocks receiving, at the first UE, a D2D preparation message from the access network, the D2D preparation message identifying a first data block; selecting, as an initial data block to send to the second UE over the D2D path, the first data block identified by the D2D preparation message; and sending a stream of D2D data blocks to the second UE over the D2D path, the stream of D2D data blocks beginning with the identified first block.

According to at least one example embodiment the D2D preparation message includes a sequencing numbering indication indicating a data block sequencing numbering used for blocks transmitted on a downlink path between the access network and the second UE, the downlink path being the path used to deliver the blocks in the stream of uplink data blocks from the access network to the second UE, and sending the stream of D2D data blocks may include setting, at the first UE, a data block sequencing numbering of the stream of D2D blocks based on the sequencing numbering indication, and including, in the stream of D2D blocks, data blocks stored in the buffer having sequence numbers newer than a sequence number of the identified first block.

According to at least one example embodiment the method may further include receiving, at the first UE, a bearer message indicating to the mobile that a dedicated bearer has been established at the access network, before sending the stream of uplink data blocks to the second UE, wherein the sending the stream of uplink data blocks from the first UE to the second UE includes sending the stream of uplink data blocks to the second UE through the uplink path using the dedicate bearer.

According to at least one example embodiment, a network element may include a processor configured to control operations for facilitating path switching, for a communication path between a first user equipment (UE) and a second UE, from a device to device (D2D) path to network path, the operations including, receiving, at the network element, switch point information from the first UE, the switch point information identifying a data block that has been sent from the first UE to the second UE over the D2D path; establishing, at the network element, a connection with the first UE over an uplink path between the first UE and the network element; establishing, at the network element, a connection with the second UE over a downlink path between the network element and the second UE; setting, at the network element, a data block sequencing numbering to be the same for the uplink path and the downlink path based on the switch point information; and forwarding, at the network element, data from the first UE to the second UE via the network path, the network path including the uplink path and the downlink path.

According to at least one example embodiment a mobile device may include a processor configured to control operations for performing path switching, for a communication path between the mobile device and a user equipment (UE), from a device to device (D2D) path to network path, the operations including, receiving, at the mobile device, a first message from an access network; stopping, at the mobile device, data transmission to the UE through the D2D path, in response to the first message; determining a last data block sent from the mobile device to the UE based on contents of a transmission buffer at the mobile device; sending, from the mobile device, switch point information to the access network, the switch point information identifying the last data block; establishing, at the mobile device, a connection with the access network over an uplink path between the mobile device and the access network, and sending data from the mobile device to the UE over the network path, the network path including the uplink path to the access network.

According to at least one example embodiment a network element may include a processor configured to control operations for facilitating path switching, for a communication path between a first user equipment (UE) and a second UE, from a network path to a device to device (D2D) path, the operations including, receiving, at the network element, a stream of uplink data blocks sent from the first UE to the second UE on an uplink path between the first UE and the network element; storing, in a buffer at the network element, data blocks from the stream of uplink data blocks; sending, from the network element, a stream of downlink data blocks on a downlink path between the network element and the second UE, the stream of downlink data blocks being blocks sent from the first UE to the second UE; determining, at the network element, whether the stream of uplink blocks is synchronized with the stream of downlink blocks based on an oldest data block stored in the buffer which has not yet been received at the second UE and a data block from the stream of downlink data blocks; and based on the determination, sending a D2D preparation message from the network element to the first UE, the D2D preparation message identifying an initial data block for the first UE to send over the D2D path.

According to at least one example embodiment a mobile device may include a processor configured to control operations for performing path switching, for a communication path between the mobile device and a user equipment (UE), from a network path to a device to device (D2D) path, the operations including, through an uplink path from the mobile device to an access network; receiving, at the mobile device, a first message from the access network; storing, in a buffer at the mobile device, copies of blocks from the stream of uplink data which have been acknowledged by the access network as being received, in response to the first message; receiving, at the mobile device, a synchronization buffer status message from the access network; synchronizing the buffer at the mobile device with a UL/DL synchronization buffer at the access network by removing the old data blocks; receiving, at the mobile device, a D2D preparation message from the access network, the D2D preparation message identifying a first data block; selecting, as an initial data block to send to the UE over the D2D path, the first data block identified by the D2D preparation message; and sending a stream of D2D data blocks to the UE over the D2D path, the stream of D2D data blocks beginning with the identified first block.

BRIEF DESCRIPTION OF THE DRAWINGS

At least one example embodiment will become more fully understood from the detailed description provided below and the accompanying drawings, wherein like elements are represented by like reference numerals, which are given by way of illustration only and thus are not limiting of example embodiments and wherein:

FIG. 1A is a diagram illustrating a portion of a wireless communications network.

FIG. 1B is a diagram illustrating a portion of a wireless communications network according to example embodiments.

FIG. 2 is a diagram illustrating a user plane protocol stack in network routed communication.

FIG. 7 is a communication flow diagram illustrating procedures for performing a switch from network routed communications to D2D routed communications according to at least one example embodiment.

DETAILED DESCRIPTION OF EXAMPLE EMBODIMENTS

Figure 3:
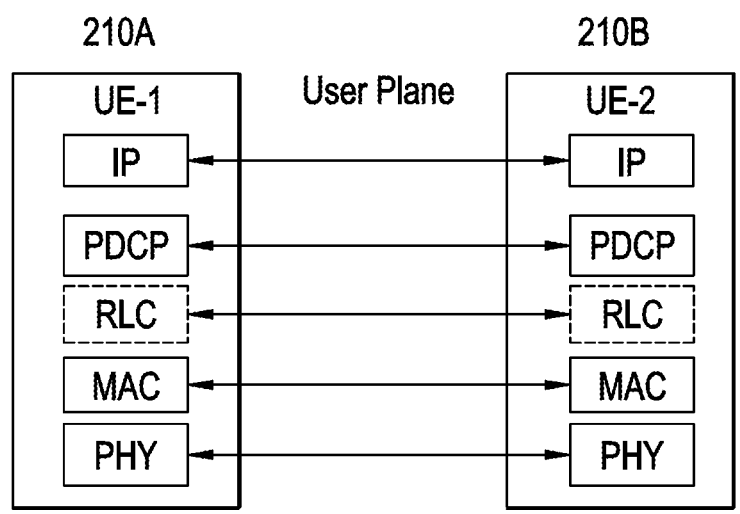
FIG. 3 is a diagram illustrating a user plane protocol stack in D2D communications according to example embodiments.

Various embodiments will now be described more fully with reference to the accompanying drawings in which some example embodiments are shown.

Detailed illustrative embodiments are disclosed herein. However, specific structural and functional details disclosed herein are merely representative for purposes of describing at least one example embodiment. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term user equipment (UE) may be considered synonymous to, and may hereafter be occasionally referred to, as a UE unit, UE station, UE user, a mobile, terminal, access terminal (AT), subscriber, user, remote station, access terminal, receiver, etc., and may describe a remote user of wireless resources in a wireless communication network. The term enhanced Node B (eNB), may be considered synonymous to and/or referred to as a base station (BS), base transceiver station (BTS), NodeB, access point (AP), etc. and may describe equipment that provides the radio baseband functions for data and/or voice connectivity between a network and one or more users.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types.

The program modules and functional processes discussed herein may be implemented using existing hardware in existing communication networks. For example, program modules and functional processes discussed herein may be implemented using existing hardware at existing network elements or control nodes (e.g., hardware in the UEs and network elements illustrated in FIGS. 1-7 and discussed in greater detail below). Such existing hardware may include one or more digital signal processors (DSPs), application-specific-integrated-circuits (ASICs), field programmable gate arrays (FPGAs) computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

Overview of Device to Device (D2D) Communications

FIG. 1A is a diagram illustrating a portion of a wireless communications network 100. Referring to FIG. 1A, wireless communications network 100 may follow, for example, a Long Term Evolution (LTE) architecture. Communications network 100 includes a plurality of user equipment (UEs) including first and second UEs 110a and 110b which are in communication with an access network AN 160. The AN 160 includes both radio access network (RAN) elements and core network (CN) elements. The AN 160 may include, for example, an enhanced NodeB (eNB) 120, a mobility management entity (MME) 130, a system architecture evolution (SAE) serving gateway (SGW) 140, and a packet data network (PDN) gateway (PGW) 150. The first and second UEs 110a and 110b communicate with the AN 160 via the eNB 120. The eNB 120 is connected to the MME 130 for management signaling and SGW 140 for user data transport. The SGW 140 is connected to the PGW 150. Herein, the AN 160 may be considered synonymous to, and occasionally referred to as, 'the network'.

Each of the first and second UEs 110a and 110b may send data to, and receive data from, the eNB 120 through respective, bidirectional, wireless communications links. The eNB 120 may provide wireless coverage for UEs within a coverage area, or cell, of the eNB 120. The MME 130 handles management of UEs connected to the AN 160. The SGW 140 provides access for the first eNB 120 to the PGW 150. The PGW 150 provides the first eNB 120 with access to other packet data networks including, for example the internet, via the SGW 140. Though not pictured, wireless communications network 100 may include other elements of an LTE CN.

The first and second UEs 110A and 110B may be, for example, UE phones, smart phones, computers, or personal digital assistants (PDAs).

Though wireless communications network 100 is discussed above as following LTE access technology, wireless communications network may follow any known access technology. Further, the wireless communications network 100 may be a time division duplexed (TDD) or frequency division duplexed (FDD) network. In frequency division duplex (FDD) links between the eNB 120 and each of the UEs attached the eNB 120 are separated in spectrum: one part of the spectrum is allocated to the uplink and another part of the spectrum is allocated to the downlink. In time division duplex (TDD), the links are separated in time, but occupy the same spectrum. While some example embodiments have been described with reference to FDD and/or TDD, it should be understood that example embodiments should not be limited thereto and any other known method such as orthogonal frequency-division multiplexing (OFDM), code-division multiplexing or Wi-Fi may be used.

Wireless network 100 represents an example of traditional broadband network design which focuses on enabling communication services among users, such that the user traffic always traverses the network core infrastructure. This approach offers some user management benefits to network operators, such as the ability to authenticate UEs, and to track the user behavior in terms of resource utilization (e.g. bandwidth consumption on the air interface and amount of data traffic uploaded/downloaded over time). In addition, enforcing traffic to traverse the core of the broadband network enables the support of Lawful Interception (LI) of data and/or voice calls by law enforcement authorities. This is because the CN has explicit access to user traffic and thus can provide mechanisms to LI entities for obtaining the traffic exchanged between specific users, upon legally authorized request.

However, enforcing traffic to always traverse the CN introduces significant limitations and overheads in certain deployment scenarios. As an example, let us consider the case where two subscribers of the same long term evolution (LTE) network, namely first UE 110a and second UE 110b, which are attached to the same eNB, eNB 120, wish to establish a data communication so that they initiate a video call over LTE. In a traditional LTE setting, packets of the first UE 110 and the second UE 110b would be exchanged via the LTE CN. For example, as shown in FIG. 1, in the wireless communications network 100, packets sent from the first UE 110a to the second UE 110b may follow path 115a through the eNB 120, SGW 140 and PGW 150. Likewise, packets sent from the first UE 110b to the second UE 110b may follow path 115b, which also includes the eNB 120, SGW 140 and PGW 150.

For example, while first and second UEs 110a and 110b are within each other's transmission range, packets of the first UE 110a travel via the eNB 120 up to the PGW 150, terminate at the binding associated with the IP session of the first UE 110a IP session, bridge to the binding associated with the IP session of the second UE 110b, and from there packets return back to the same eNB, the eNB 120, and are delivered to the second UE 110b. Given that multiple similar communication sessions among neighboring users may take place simultaneously, enforcing such traffic traversal via the CN increases the utilization of both the radio access network (RAN) entities (e.g. the eNB 120) and the CN entities (e.g. the SGW 140 and PGW 150), and additionally consumes excessive amounts of both backhaul and wireless bandwidth.

FIG. 1B is a diagram illustrating a portion of a wireless network 105 according to at least one example embodiment. The wireless network 105 supports D2D communication between UEs. The structure of the wireless network 105 is substantially similar to that discussed above with reference to the wireless network 100 illustrated in FIG. 1A. Accordingly, only those aspects which differ will be discussed. In the wireless network 105, the first and second UEs 110a and 110b may perform D2D communication by sending data to one another directly, without first sending that data through the AN 160, as is indicated by communications paths 117a and 117b.

In order to enable D2D communications, UEs included in the wireless network 105 may include base station receiving and/or transmitting functions. The base station receiving function is the ability to receive data that has been transmitted on an uplink channel by a UE. The base station transmitting function is the ability to transmit data over a downlink channel in a manner that can be decoded by a UE. In the case where the wireless network 105 is a FDD network, UEs included in the wireless network 105 may include a base station transmission and/or receiving module in order to enable base station transmission and/or reception. In the case where the wireless network 105 is a TDD network, an additional module may not be required to enable base station transmission and/or reception. Base station transmission and reception abilities in UEs are discussed in U.S. application Ser. No. 13/425,957, the entire contents of which are incorporated herein by reference.

The ability for the first UE 110a to send traffic directly to the second UE 110b over the air interface, without the need to involve either the RAN or the CN infrastructure, may increase overall network utilization by offloading data from the CN. However, an important aspect for enablement of D2D communication is providing process for UEs to perform D2D path switching. As used herein, D2D path switching refers collectively to the process of switching a data bearer from traditional network routed communication to D2D routed communication, and the process of switching a data bearer from D2D routed communication to network routed communication. As used herein, network routed communication refers to communication between UEs where user data communicated between the UEs travels on the network path through a data bearer which passes through the CN, for example, via the eNB 120 illustrated in FIGS. 1A and 1B. As used herein, D2D routed communication refers to communication where user data communicated between the UEs travels on the D2D path directly between the UEs via a data bearer established between the two UEs which does not pass through the CN. As used herein, the terms 'network path' and 'D2D path' may be considered synonymous to, and may be occasionally referred to as, 'network route' and 'D2D route', respectively.

Example Goals of Bearer Switching Between Network Routed and D2D Routed Communications As is discussed above, D2D routed communication refers to a capability of UEs in a cellular network to support a bearer path between themselves that does not run through an eNB. According to at least one example embodiment, a method for implementing D2D that is envisaged is one where the control path for the communication still passes through the eNB.

Goals for bearer and IP address management according to at least one example embodiment include:

(i) concurrent communication (a) between UEs though D2D, and (b) between UEs and the eNB;
(ii) switch the D2D direct path to a network routed path and back based on lower-layer triggers corresponding to a change in the relative proximity of the UEs communicating with each other directly though D2D;
(iii) continuation of ongoing communications while switching between D2D and network routed paths to minimize the service delay/interruption time, packet loss, and maintain the desired quality of service (QoS) requirement.
(iv) both commercial and public safety scenarios when network is available According to at least one example embodiment, it is assumed that there is no requirement to split one application flow onto two different routes (the D2D route and the network route) simultaneously, because such a scenario may imply the need for two different IP addresses for these two concurrently operative routes.

According to at least one example embodiment, bearer switching between D2D path switching is accomplished through enhancement of the layer handles the re-sequencing and retransmission of the data block at the radio link (e.g. the PDCP layer in LTE). Apparatuses and methods for accomplishing bearer switching are described with reference to networks following the LTE protocol. However, the LTE protocol is used as an example. Similar mechanisms also exist in other radio access technologies (RATs). Therefore, a method for facilitating D2D path switching according to at least one example embodiment may be applied to other RAT types including scenarios where the D2D path and network routed path are in the same RAT, and scenarios where the D2D routed path and the network routed path are in different RATs (e.g. the network route is in an LTE network and D2D route employ the WiFi access technology). Further, according to at least one example embodiment, methods for facilitating D2D path switching may be used to support both commercial and public safety scenarios, for example, when the network is available.

A mechanism for identifying the D2D path may facilitate achievement of the goals discussed above and will now be discussed in greater detail below.

Network Stack Enhancement and Path Identification

One possible way to identify a path used for D2D would be to identify a specific path using a specific port. However, using a port to identify a D2D path on an application level may be difficult because applications are often unaware of the existence of a D2D path.

Alternatively, the packet data protocol (PDP) context may be used. The PDP context determines the path and, using the PDP context, D2D devices can be informed that specific packets will be taking the D2D path. Generally, the PDP is responsible for the transport of the application layer packets. One common example of a PDP is the internet protocol (IP). The end points for PDP for conventional network routed communication in LTE networks are the P-GW and the UE. The PDP context is a data structure residing at these end points and are generally activated when the session is active. For a given UE, the PDP context contains the IP address and International Mobile Subscriber Identity (IMSI) of the UE, and the tunnel endpoint IDs for the network nodes in the data path through which the UE is communicating.

FIG. 2 is a diagram illustrating a user plane protocol stack used in network routed communication.

FIG. 2 illustrates a protocol stack for an LTE network. FIG. 2A illustrates an example where a first example UE 210A is communicating with a second example UE 210B through a communications network which includes eNBs 220A and 220B, SGWs 230A and 230B and PGWs 240A and 240B. As is illustrated in FIG. 2, the eNB 210 and the PGW 240A communicate with one another via the IP layer of the protocol stack. The UE 210A and the eNB 220A communicate with one another via the packet data convergence protocol (PDCP), radio link control (RLC), media access control (MAC) and physical (PHY) layers of the protocol stack. Further, the eNB 220A, SGW 230A and PGW 240A communicate with one another via the GTP-U, user datagram protocol (UDP) and IP protocols. As is known, GTP-U is a member of the general packet radio (GPRS) tunneling protocol (GTP), and is used to handle user data. The UE 210B, eNB 220B, S-GW 230B, and PGW 240B communicate with one another in the manner discussed above with reference to the UE 210A, eNB 220A, S-GW 230A, and PGW 240A.

Multiple PDP contexts can be associated with the same IP address, but each IP address will have different PDP contexts. A corollary is that D2D and network routed communications may be supported with a single IP address in a given UE.

Accordingly, it may be desirable to implement a filter at a UE for associating a particular PDP context with a D2D path. In the LTE context, the PDP context carries data for multiple applications.

In conventional network routed communication, the RLC layer and PDCP layer conduct the radio link block re-sequencing and re-transmission. When a hand over occurs, in accordance with known methods, RLC is reset and PDCP conducts the re-sequencing and re-transmission functions. According to at least one example embodiment of a method for facilitating D2D path switching, PDCP is enhanced to support the switch between the D2D route and network route. As will be discussed in greater detail below, the major enhancements to the PDCP may include, for example: uplink (UL)/downlink (DL) sequence synchronization, continuation of re-sequencing and re-transmission during the D2D path switching, and context transfer during D2D path switching.

D2D Protocol Stack and Packet Header Reduction

FIG. 3 is a diagram illustrating a user plane protocol stack in D2D communications according to example embodiments. FIG. 3 represents a scenario in which the eNBs 210A and 210B illustrated in FIG. 3 have commenced D2D routed communications.

As is illustrated in FIG. 3, after the data bearer between UEs 210A and 210B is switched to a D2D route from a network route, the UEs 210A and 210B may communicate with one another directly through, for example, the IP, PDCP, RLC, MAC and PHY layers. Further, all the network elements illustrated in FIG. 2 (e.g., the eNBs, SGWs and PGWs) may be bypassed. As a result, according to at least one example embodiment, when D2D packet encapsulation is conducted, it may not be necessary to include in the D2D packet header all the packet headers for routing the packet among the network elements. For example, headers containing IP addresses of sources and destinations of the network elements may be excluded. The overhead of a D2D packet may be reduced to minimize the interference to others at the air interface. According to at least one example embodiment, an indication of D2D type of packet may be added to the packet header for differentiation from non-D2D packets. According to at least one example embodiment, the RLC layer will remain in D2D stack for retransmission and re-sequencing during the D2D operation after the switch. Further, the switch between the D2D path and network path will be handled by the PDCP layer. More specifically, as will be discussed in greater detail below, the PDCP layer will conduct a context transfer for the switch from D2D routed communications to the network routed communications, as well as re-sequencing and re-transmission during the transition period corresponding to the switch from D2D routed communications to network routed communications.

According to at least one example embodiment, the first and second UEs 110A and 110B may operate in the same manner described above with reference to the example UE 210A and the example UE 210B, respectively. Further, the eNB 120, SGW 140, and PGW 150 may operate in the same manner discussed above with reference to the eNB 220A, SGW 230A and PGW 240A, respectively.

An overview of a method and apparatus for facilitating D2D path switching will now be discussed below.

Overview of Method and Apparatus for Facilitating D2D Path Switching

For D2D path switching, a first insight is to follow an approach similar to the bearer management process used during a UE handover (HO) operation between base stations.

During HO, RLC needs to be terminated at one base station and started at another. Re-sequencing and retransmission of packets that were handled by RLC are handled instead by PDCP because RLC has been terminated. It may be preferable, for the PDCP context transfer to go through the backhaul between the eNBs that the UE is switching between. The above-referenced PDCP context switch which takes place during an HO operation deals with the context for only one UE.

In the case of D2D path switching, there are however key differences relative to the HO operation. In the D2D-to-network route switch, the single D2D PDCP & RLC connections between the D2D UE pair need to be evolved to a pair of uplink and downlink PDCPs & RLC connections between each of the UEs and the eNB. In the network-to-D2D route switch, two pairs of PDCP/RLC contexts associated, respectively, with the two UEs communicating with one another need to be consolidated into one D2D PDCP/RLC context. In addition, the intended context information transfer may be required over the air interface rather than the backhaul as for the HO. Therefore, in switching from the D2D routed communications to the network routed communications, it may be desirable to enhance the PDCP and RLC layers in order to use the PDCP and RLC layers to re-sequence packets.

To complete the bearer switch for a UE, the scheduler which operates in the eNB directs transmission by the UE to either the eNB or another UE.

For the D2D routed communication, the default bearer is set up at the network but the scheduler actions dictate which receiver (the UE or the eNB) attempts to decode the data packet. Timers may be extended (or triggered differently) in the eNB so that an absence of data does not lead to the connection being torn down.

PDCP and RLC run at both the transmitter UE and receiver UE. For example, as will be discussed in greater detail below, there is a PDCP buffer for retransmission at a transmitting UE and the re-sequencing buffer at a receiving UE. For the purpose of simplicity, herein, D2D routed communications between a pair of UEs will be described primarily with reference to a scenario in which one UE is a transmitting UE and the other UE is a receiving UE. The transmitting UE transmits user data via the D2D routed bearer connected directly between the pair of UEs, and a receiving UE receives the transmitted user data via the D2D routed bearer. Likewise, network routed communications between a pair of UEs will be described primarily with reference to a scenario in which one UE is a transmitting UE and the other UE is a receiving UE. The transmitting UE transmits user data via the network routed bearer connected between the pair of UEs via the CN, and a receiving UE receives the transmitted user data via the network routed bearer. However, with respect to any pair of UEs described herein as participating in either D2D or network routed communications, either UE of the pair may be both a transmitting UE and a receiving UE with respect to the other UE in the pair.

Similar to an HO operation, during D2D/NW path switch, we let PDCP handle the continuation of the re-sequencing and re-transmission. The basic assumption and requirement is that at the same eNB, the segmentation rule for the same application of the connected (TX and RX) UE pair shall be the same. According to at least one example embodiment, an application flow specifically from the transmitting UE to the receiving UE should be identified by the eNB. Certain network support may be desirable including, for example, a dedicated bearer for carrying application flows from a transmitting UE to a receiving UE. This dedicated bearer may be enabled at the network to separate out the application flows associated with the D2D communications between the transmitting UE and the receiving UE from among other application flows in case simultaneous applications with additional UEs exist at the transmitting UE or the receiving UE. It can be observed that after D2D path is enabled, the D2D bearer is already separated from the normal network bearer if there are simultaneous applications through the network. In this embodiment, the D2D bearer is split out from the normal bearer in the alert state before the D2D path is enabled to support the D2D preparation in the alert state.

Example Apparatuses and Methods for Facilitating D2D Path Switching

Apparatuses for facilitating D2D path switching between network routed and D2D routed communications according to at least one example embodiment will now be discussed in greater detail below with reference to FIGS. 4A and 4B.

Figure 4A:
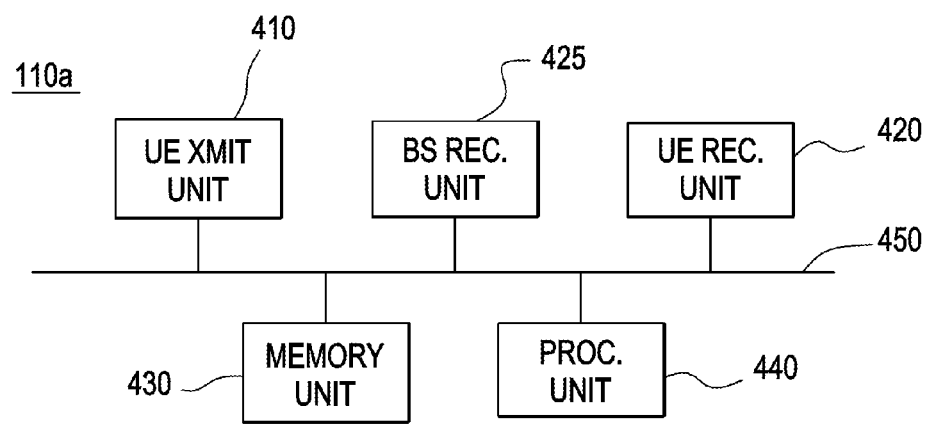
FIG. 4A illustrates an example structure of the first UE 110a illustrated in FIG. 1B with respect to an example in which the first UE 110a has base station receiving functionality.

FIG. 4A is a diagram illustrating an example structure of the first UE 110a illustrated in FIG. 1B with respect to an example in which the first UE 110a has base station receiving functionality. While only the first UE 110a is shown, it should be understood that other UEs in the wireless communications network 105, including the second UE 110b, may have the same structure.

The first UE 110a, shown in FIG. 4A, is configured to receive data from a neighboring UE (e.g., the second UE 110b) over an uplink channel of a network. The first UE 110a is configured to receive control information for reception over a bi-directional link between the first UE 110a and a base station. The first UE 110a is configured to listen in designated slots of an uplink channel of the network. The first UE 110a may be configured to receive transmission parameters from a base station and may be configured to determine reception parameters based on the transmission parameters. The first UE 110a may be configured to directly communicate with the peer UE in a half-time-duplex mode. The first UE 110a may include, for example, a UE transmitting unit 410, a UE receiving unit 420, a base station receiving unit 425, a memory unit 430, a processing unit 440, and a data bus 450.

The UE transmitting unit 410, UE receiving unit 420, base station receiving unit 425, memory unit 430, and processing unit 440 may send data to and/or receive data from one another using the data bus 450. The UE transmitting unit 410 is a device that includes hardware and any necessary software for transmitting wireless signals on the uplink (reverse link) including, for example, data signals, control signals, and signal reception quality information via one or more wireless connections to other wireless devices (e.g., base stations).

The UE receiving unit 420 is a device that includes hardware and any necessary software for receiving wireless signals on the downlink (forward link) channel including, for example, data signals, control signals, and signal reception quality information via one or more wireless connections from other wireless devices (e.g., base stations). The UE receiving unit 420 receives control information for reception over a bi-directional link between the first UE 110a and the eNB 120. The first UE 110a listens in designated slots of an uplink (reverse link) of the network.

The base station receiving unit 425 is implemented, for example, as a receiver chain including a low noise amplifier, mixer, filter, and baseband processor configured to receive signals transmitted on an uplink channel.

The memory unit 430 may be any storage medium capable of storing data including magnetic storage, flash storage, etc.

The processing unit 440 may be any device capable of processing data including, for example, a microprocessor configured to carry out specific operations based on input data, or capable of executing instructions included in computer readable code. For example, the processing unit 440 may control operations including measuring reception qualities of signals received from peer UEs.

Figure 4B:
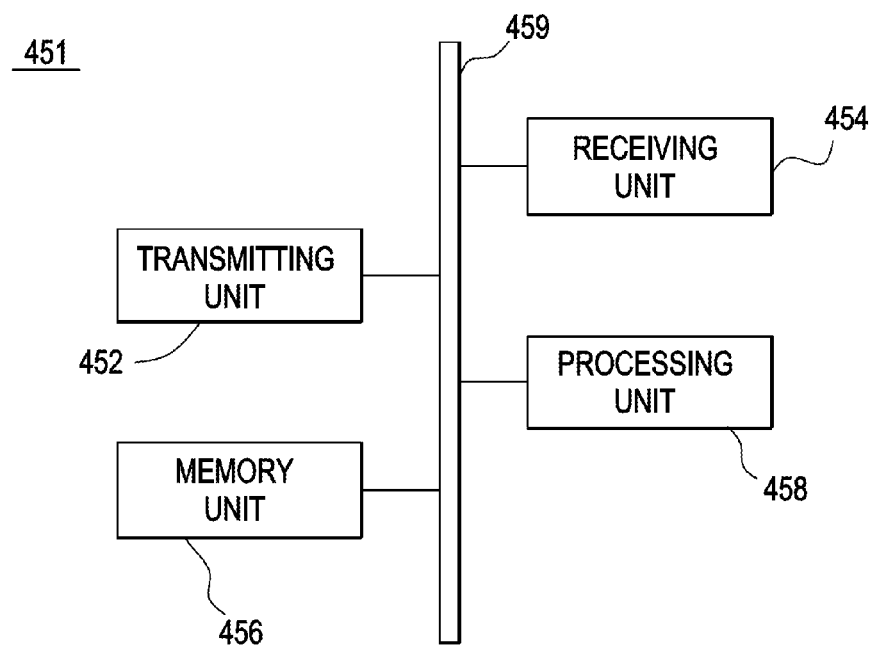
FIG. 4B is a diagram illustrating an example structure of a network element.

FIG. 4B is a diagram illustrating an example structure of a network element 451. According to at least one example embodiment, the network element 451 may represent any device within the AN 160 of FIG. 1B. For example, the eNB 120 illustrated in FIG. 1B may include the structure described below with reference to the network element 451.

Referring to FIG. 4B, the network element 451 may include, for example, a data bus 459, a transmitting unit 452, a receiving unit 454, a memory unit 456, and a processing unit 458.

The transmitting unit 452, receiving unit 454, memory unit 456, and processing unit 458 may send data to and/or receive data from one another using the data bus 459.

The transmitting unit 452 is a device that includes hardware and any necessary software for transmitting signals including, for example, control signals, and media data including video and/or audio data via one or more wired and/or wireless connections to other network elements in communications network 105.

The receiving unit 454 is a device that includes hardware and any necessary software for receiving wireless signals including, for example, control signals, and media data including video and/or audio data via one or more wired and/or wireless connections to other network elements in communications network 105.

The memory unit 456 may be any device capable of storing data including magnetic storage, flash storage, etc.

The processing unit 458 may be any device capable of processing data including, for example, a microprocessor configured to carry out specific operations based on input data, or capable of executing instructions included in computer readable code which may be stored, for example, in the memory unit 456.

Methods for facilitating D2D path switching according example embodiments will now be discussed in greater detail below with reference to FIGS. 5-7. Methods for facilitating a path switch from a D2D route to a network route will be described with reference to FIG. 5. Methods for facilitating a path switch from a network route to a D2D route will be described with reference to FIGS. 6 and 7.

According to at least one example embodiment, operations described below as being performed by an eNB may be performed by the eNB 120 including the structure of the network element 451 illustrated in FIG. 4B. For example, the memory unit 456 may store executable instructions corresponding to each of the operations or functions described below for an eNB with reference to FIGS. 5-7. Further, the processing unit 458 may be configured perform each of the operations or functions described below for an eNB with respect to FIGS. 5-7, for example, by executing executable instructions stored in the memory unit 256. Further, operations described below as being performed by a UE may be performed by a UE having the structure of the UE 110A described with reference to the FIG. 4A. For example, the memory unit 430 may store executable instructions corresponding to each of the operations or functions described below for a UE with reference to FIGS. 5-7. Further, the processing unit 440 may be configured perform each of the operations or functions described below for a UE with reference to FIGS. 5-7, for example, by executing executable instructions stored in the memory unit 430.

Example Methods for Facilitating D2D-to-Network Route Switching

Figure 5:
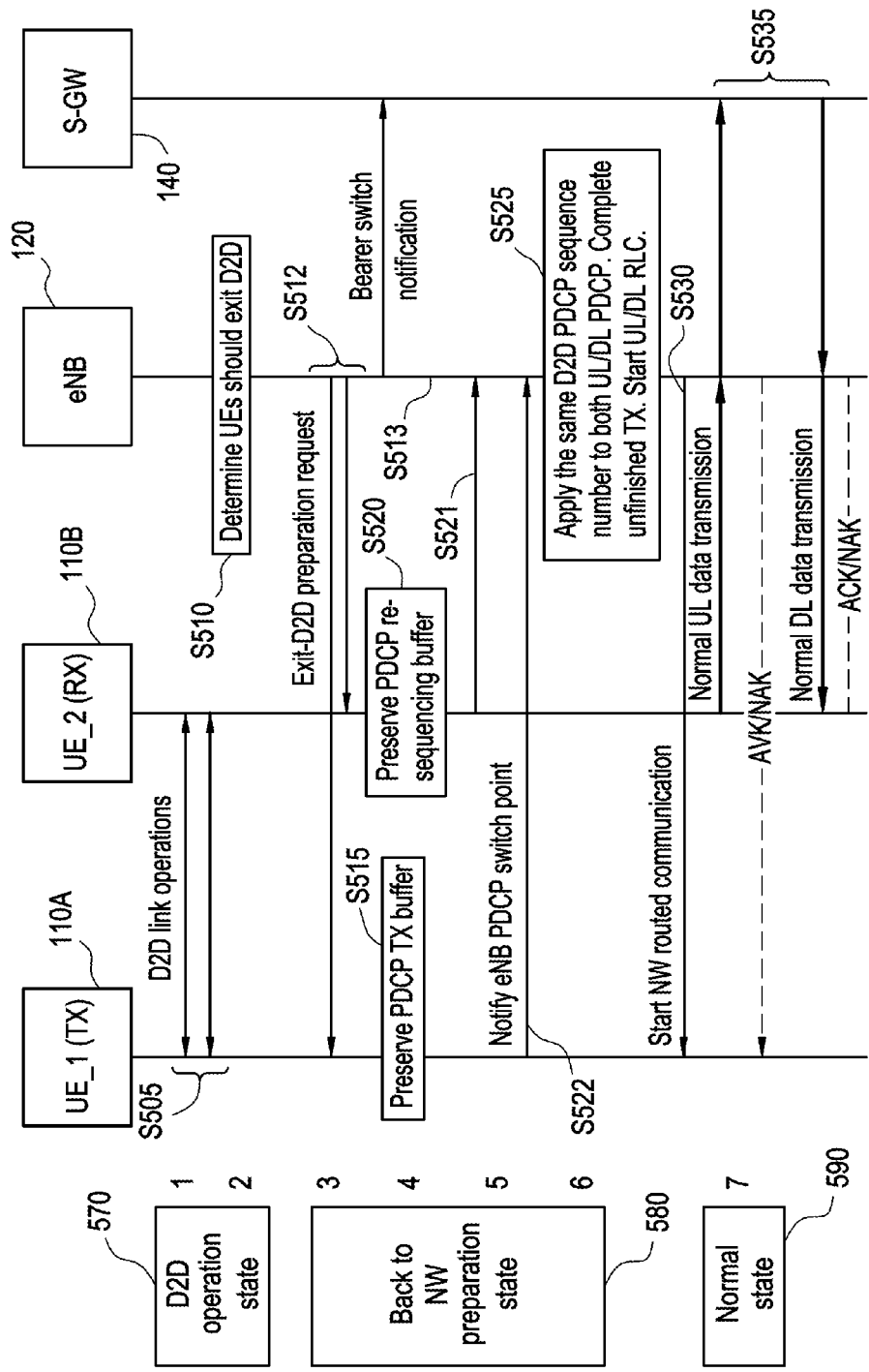
FIG. 5 is a communication flow diagram illustrating procedures for performing a switch from D2D routed communications to network routed communications according to at least one example embodiment.

FIG. 5 is a communication flow diagram illustrating procedures for performing a switch from D2D routed communications to network routed communications according to at least one example embodiment.

Methods for facilitating D2D-to-network path switching will now be discussed below with reference to FIG. 5. FIG. 5 will be explained with reference to communications network 105 illustrated in FIG. 1 in a scenario where the first UE 110A is a transmitting UE, the UE 110B is a receiving UE, and the first and second UEs 110A and 110B are switching from D2D routed communications to network routed communications.

With respect to D2D-to-network route switching a first approach is to keep the transmission (TX) part of the PDCP layer at the first UE 110A and the receiving (RX) part of the PDCP layer at the second UE 110B. Then the RX part of PDCP layer is enabled for the first UE 110A at the eNB 120 and the TX part of the PDCP layer is enabled at the eNB 120 for the second UE 110B. Further, according to at least one example embodiment, both the PDCP layer between the eNB 120 and the first UE 110A, and the PDCP layer between the eNB 120 and the second UE 110B adopt the same sequence numbering used at the PDCP layer between the first and second UEs 110A and 110B for the D2D communications performed prior to the D2D-to-network route switch.

An alternative approach includes dropping the un-finished packet, starting from a new packet after switch, or waiting until the ongoing packet transmission is completed then switching the path and beginning the transmission of a new packet. The discussion below focuses on the approach which may result in the least amount of packet loss and delay, the first approach.

Referring to FIG. 5, according to at least one example embodiment, methods for facilitating D2D-to-network route switching may be divided into three states, a D2D operation state 570, a back to network preparation state 580, and a normal network operation state 590. According to at least one example embodiment, in the D2D operation state, D2D routed communication is still taking place between the first and second UEs 110A and 110B; in the back-to-network preparation state 580, the eNB 120, the first UE 110A and the second UE 110B perform operations in preparation for switching the bearer between the first and second UEs 110A and 110B from the D2D route to the network route; and in the normal network operation state 590, the D2D-to-network route switch is complete, and network routed communication proceeds between the first and second UEs 110A and 110B.

Referring to FIG. 5, according to at least one example embodiment, the D2D operation state 570 begins with step S505. In step S505, the first UE 110A sends data to the second UE 110B performing D2D routed communications.

In step S510, the eNB 120 determines that the first and second UEs 110A and 110B should cease D2D routed communications. For example, the eNB may monitor a signal quality (e.g., a signal to interference plus noise ratio (SINR) reported by the UEs) of the D2D link carrying communications between the first and second UEs 110A and 110B, and may decide to instruct the first and second UEs 110A and 110B to cease D2D routed communication and to begin network routed communications based on the detected signal quality falling below a reference threshold.

According to at least one example embodiment, the back-to-network preparation state 580 begins with step S512. In step S512, the eNB 120 sends an exit D2D preparation request to the first and second UEs 110A and 110B.

In step S513, the eNB 120 send a bearer switch notification message to the SGW 140 indicating to the rest of the network to prepare the D2D bearer being switched back or merged with existing comparable bearer with the network In step S515, in response to receiving the exit D2D preparation request, the first UE 110A resets its RLC layer, and preserves its current PDCP transmission buffer. The first UE 110A also stops D2D communications with the second UE 110B and notes a sequence number of the last block sent to the second UE 110B via the D2D link.

In step S520, in response to receiving the exit D2D preparation request, the second UE 110B resets its RLC layer, and preserves its current PDCP re-sequencing buffer.

In step S521, the second UE 110B may send lost data information to the eNB 120 identifying packets which have not yet been received by the second UE 110B. The second UE 110B may identify the missing packets using, for example, the PDCP re-sequencing buffer preserved in step S520.

In step S522, the first UE 110A sends a PDCP switch point information to the eNB 120. The PDCP switch point information may include, for example, the sequence number of the last block sent to the second UE 110B and the information for bearer re-establishment noted in step S515.

In step S525, the eNB 120 establishes RLC and PDCP connections on the UL path from the first UE 110A and the eNB 120, and the eNB 120 establishes RLC and PDCP connections on the DL path from the eNB 120 to the second UE 110B. The eNB 120 adopts the same PDCP sequencing numbering for both the UL and DL paths, for example based on the PDCP switch point information received from the first UE 110A. Further the eNB 120 may perform any necessary re-sequencing and retransmission of data packets. For example, based on the lost data information received from the second UE 110B in step S521, the eNB 120 may instruct the first eNB 110A to send, to the eNB 120, packets that need to be re-transmitted to the second UE 110B. The eNB 120 may then send the packets in need of retransmission to the second eNB 110B.

According to at least one example embodiment, the normal network operation state 590 begins with step S530. In step S530, the eNB 120 may send a message to the first UE 110A instructing the first UE 110A to begin network routed communication with the second US 110B.

In step S535, in response to the message sent from the eNB 120 in step S530, the first UE 110A may begin network routed operations with the second UE 110B. Accordingly, network routed communications begin traveling along the UL path between the first UE 110A and the eNB 120, through the rest of the AN 160 including the SGW 140, and along the DL path between the eNB 110 and the second UE 110B.

According to the methods for facilitating D2D-to-network route switching explained above with reference to FIG. 5, switching between D2D routed communication and network routed communication may be accomplished while reducing or minimizing an amount of data loss and delay caused by the switch.

Example Methods for Facilitating Network-to-D2D Route Switching

Figure 6:
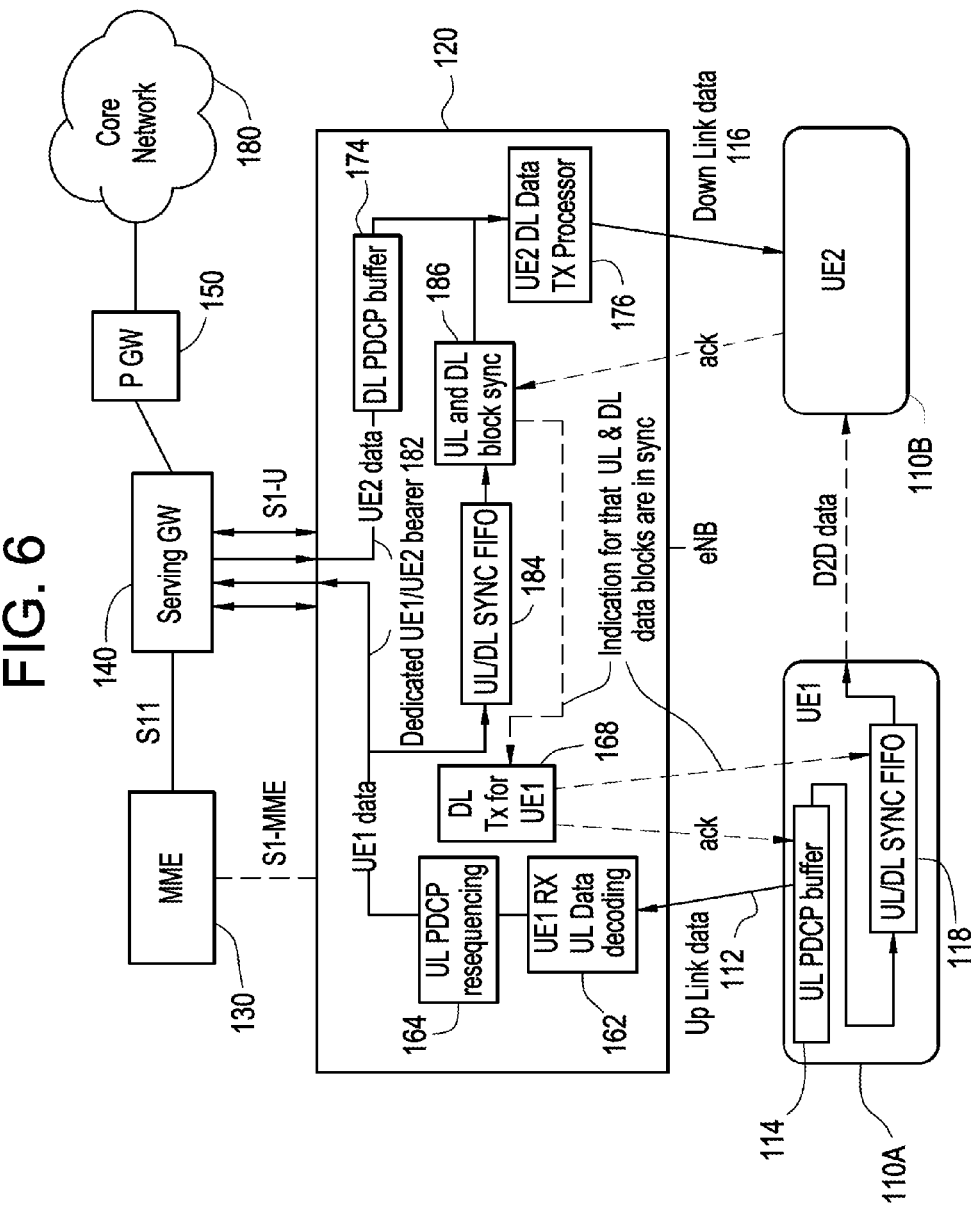
FIG. 6 is a diagram explaining context recovery through uplink (UL) and downlink (DL) data synchronization for a UE pair.

FIG. 6 is a diagram explaining context recovery through uplink (UL) and downlink (DL) data synchronization for a UE pair. FIG. 7 is a communication flow diagram illustrating procedures for performing a switch from network routed communications to D2D routed communications according to at least one example embodiment.

After an eNB has detected that a pair of UEs in communication with each may be eligible for D2D communication, the eNB should prepare for a bearer switch from the network routed communication to D2D routed communication. There are multiple options for accomplishing network-to-D2D route switching. Three options will now be discussed below.

Option 1: Enabling D2D data transmission after all the data remaining in the network has been transmitted to the receiving UE after directing the transmitting UE to stop further transmissions. Option 1 may include the following steps.

1. After the eNB has decided that UE pair, including a transmitting UE and a receiving UE, meet the D2D proximity and link condition requirements, the eNB will notify the transmitting UE (the transmitter) to stop normal UE to eNB data transmission.
2. The data transmission from the eNB to receiving UE is continued till all the data delayed in the network is transmitted to the receiving UE.
3. After the residual data in the system has been delivered to the receiving UE, the network, for example the eNB, will instruct the transmitting UE to start direct D2D communications and start to schedule the D2D transmission by the transmitting UE and reception by the receiving UE.
4. The eNB determines then whether the last data block received by it from UE 1 has been delivered to the receiving UE. As one possible approach for making this determination, the eNB will store the last successfully received data block from the transmitting UE and then compare it (e.g., by performing bitwise correlation) with the incoming blocks for DL transmission to the receiving UE. Whenever an incoming DL block for the receiving UE is a match with the last block received from the transmitting UE, the eNB knows that it is the last data block to be transmitted to the receiving UE. As another possible approach, when the eNB gets into the D2D path switch preparation state, the eNB starts a timer. When the timer is expired, the eNB considers all the data packets delayed in the network as having been delivered to the receiving UE.
5. Upon receipt, at the eNB, of the acknowledgement (ACK) from the receiving UE corresponding to the last data block (or, alternatively, expiration of the timer), the eNB will notify the transmitting UE and the receiving UE of the start of the D2D transmissions. The notification is a message from the eNB to the transmitting UE and the receiving UE indicating resource availability for either loosely or strictly controlled D2D transmission, where strict network control denotes a scenario where the network controls and schedules every D2D transmission, and loose network control denotes a scenario where the network provides less strict control including guidance for D2D transmissions.

Option 1, discussed above, works for bi-directional D2D communication whereby the transmitting UE is also a recipient of data from the receiving UE. In this case, the D2D transmission is only triggered after both UEs in the UE pair have received their outstanding network routed data.

The merit of the option 1 is that it is simple. The drawback is that the waiting (preparation) time could be long for the network to clean up all the delayed data packets/blocks. The delayed data packets/blocks may be buffered at different network elements. The preparation time for D2D transmission may be long.

Option 2: Drop all the data packets delayed in the NW. In accordance with option 2, the PDCP sequence number is reset to zero and D2D transmission start from a new packet at UE1. Option 2 is simple. However all data delayed in the NW will be lost.

Option 3: Context recovery via UL and DL data synchronization. The motivation behind option 3 is to minimize the preparation time and packet loss for switching the bearer from the normal network routed communication to D2D communication. FIG. 6 is an expanded view of the communications network 105 illustrated in FIG. 1B for explaining context recovery through UL and downlink DL data synchronization for a UE pair. FIG. 6 will be explained with reference to a scenario where the first UE 110A is a transmitting UE, the UE 110B is a receiving UE, and the first and second UEs 110A and 110B are switching from network routed communications to D2D routed communications.

As is illustrated in FIG. 6, the PGW 150 is connected to the CN 180. The SGW 140 is connected to the eNB 120 via an S1-U link. The MME 130 may be connected to the SGW 140 through an S11 link. The MME 130 may also be connected to the eNB 120 through an S1-MME link.

Further, during network routed communications, a PDCP connection may be established on the UL path between the first UE 110A and the eNB 120. Accordingly, UL data 112 may be buffered at UL PDCP buffer 114 included in the first UE 110A before being sent to the eNB 120, where the uplink data is decoded by the UL data decoding function 162 and buffered by the UL PDCP re-sequencing buffer 164. Further, the eNB 120 may include a first UE DL transmission function 168 for sending acknowledgments and DL data to the first UE 110A.

Additionally, during network routed communications, a PDCP connection may be established on the DL path between the eNB 120 and the second UE 110B. Accordingly, DL data 116 may be buffered and the DL PDCP buffer 174 before being sent to the second UE DL transmission function 176 which transmits the DL data 116 to the second UE 110B.

After an eNB detects that a pair of UEs in communication with each are eligible for D2D communications, a dedicated bearer 182 associated with both UE1 and UE2 is enabled for D2D preparation. Data buffers corresponding to the dedicated bearer 182 are enabled in the eNB to mimic the data that is in transit along the entire path (UE 110A→eNB 120→CN 180→eNB 120→UE 110B). Herein the data on the path UE 110A→eNB 120→CN 180 is denoted as the UL data 112, and the data on the path CN 180→eNB 120→UE2 110B is denoted as the DL data 116. The UL data 112 and the DL data 116 are in fact the same data being sent from the first UE 110A to the second UE 110B but pass through different nodes and interfaces at different time instants. According to at least one example embodiment, the eNB sync FIFO 184 may serve as the data buffer for UL data 112, and the DL PDCP buffer 174 may serve as the data buffer for the DL data 116. A UL-DL block sync function 186 may be used to determine when the UL data 112 received from the first UE 110A is in sync with the DL data 116 being transmitted by the eNB 120.

All the data buffered in the eNB sync FIFO 184 after the data segment that is in sync with the data being transmitted by the eNB 120 to second UE 110B is the data that is currently in transit over the network, and has not yet returned from the CN 180 to the eNB 120. After the buffered UL data has been synced with the DL data being transmitted by the eNB using the UL-DL block sync function, the UL data buffer will be cleared in FIFO order. For example, data blocks originally sent from the UE1 which have been successfully transmitted from the eNB to UE2 will be cleared. The existing RLC ACK/NAK mechanism can be used for this purpose. When the UL data packets/blocks in the eNB sync FIFO 184 are aligned with the DL packets/blocks in transmission from the eNB 120 to second UE 110B, the UL and DL sequential data blocks are deemed to be synchronized. When the network-to-D2D route switch occurs, the data context stored in the eNB sync FIFO 184 at the eNB can be sent directly to second UE 110B.

However, according to at least one example embodiment, D2D routed communication is still not to be started until all the data in the mirror buffer eNB sync FIFO 184 has been delivered to UE2 successfully. The preparation time may still be long. To further save the time required to perform the network-to-D2D route switch, a data buffer, UE sync FIFO 118, is enabled in the UE 1. For example, as will be discussed in greater detail below, the UE sync FIFO 118 may match the contents of the eNB sync FIFO 184. Accordingly, data blocks or packets stored in the UE sync FIFO 184 may be transmitted directly from the first UE 110A to the second UE 110B once D2D communications begin. Accordingly, the waiting time caused due to the data being buffered at other network elements can be reduced.

As is discussed above, after the eNB 120 has detected that a pair of UEs in communication with each other is under its coverage and control, the eNB enables its eNB sync FIFO 184 to mimic the network data delay and sends a D2D alert message to the first UE 110A. After the UL and DL synchronization has been achieved, the eNB 120 will notify UE1 with the information (e.g. the UL and DL PDCP sequence numbers of the same block) to sync-up the UE sync FIFO 118 with the eNB sync FIFO 184. The eNB 120 will periodically send a message to first UE 110A instructing the first UE 110A to erase out-of-date data blocks from the UE sync FIFO. When the eNB 120 decides to enable the D2D for the UE pair, it will send the starting point information (e.g., the UL & DL sequence number of the first block to be transmitted over the D2D path) to first UE 110A, then send the D2D TX starting/scheduling message upon receiving the ACK message from the UE2 for its last DL data block. An example method for facilitating network-to-D2D route switching will now be discussed below with reference to FIG. 7.

FIG. 7 will be explained with reference to communications network 105 illustrated in FIG. 1 in a scenario where the first UE 110A is a transmitting UE, the UE 110B is a receiving UE, and the first and second UEs 110A and 110B are switching from network routed communications to D2D routed communications.

Referring to FIG. 7, according to at least one example embodiment, methods for facilitating network-to-D2D route switching may be divided into four states, a normal network operation state 770, a D2D alert state 780, a D2D preparation state 785, and a D2D operation state 790. According to at least one example embodiment, in the normal network operation state 770, network routed communication is still taking place between the first and second UEs 110A and 110B; in the D2D alert state 780, communications between the first UE 110A, the eNB 120, and the second eNB 110B are monitored to determine a synchronization state of UL and DL data; in the D2D preparation state 785, the eNB 120, the first UE 110A and the second UE 110B perform operations in preparation for switching the bearer between the first and second UEs 110A and 110B from the network route to the D2d route; and in the D2D operation state 790, the network-to-D2D route switch is complete, and D2D routed communication proceeds between the first and second UEs 110A and 110B.

According to at least one example embodiment, the normal network operation state 770 begins with step S705. In step S705, the eNB 120 determines that the first and second UEs 110A and 110B are candidates for D2D communications. The eNB 120 may make this determination in accordance with known methods including, for example, determining that the first and second UEs are both within the coverage area and under the control of the eNB 120. Further, example methods for determining, at the network, UE pairs which are eligible for D2D communications are found in U.S. application Ser. No. 13/534,976, the entire contents of which are incorporated herein by reference. During step S705, network routed communications are used to send data from the first UE 110A to the second UE 110B.

In step S707, as a result of determining that the first and second UEs 110A and 110B are candidates for D2D communications, the eNB 120 sends a D2D alert message to the SGW 140 which sends the D2D alert message to the PGW 150.

In step S709, in response to the D2D alert message, the AN 160 establishes a dedicated bearer and the PGW 150 sends a notification to the eNB 120 via the SGW 140 indicating that a dedicated bearer 182 has been established for the first and second eNBs 110A and 110B. During step S709, in response to the dedicated bearer notification received from the SGW 140, the eNB 120 sends dedicated bearer notifications to each of the first and second UEs 110A and 110B indicating that data can now be sent from the first UE 110A to the second UE 110B using the dedicated bearer.

In step S711, network routed communications take place over the UL path between the first UE 110A and the CN 180 via the dedicated bearer 182.

According to at least one example embodiment, it is the existing bearer(s) if only the two UEs, first UE 110A and second UE 110B, are talking with each other. A bearer will support the applications with same/similar QoS requirement. If there are multiple applications running simultaneously, there may be multiple bearers required at the same time for the pair of the UEs. If the D2D candidate UEs are also communicating with other UEs or servers simultaneously, the dedicated bearer(s) for the two UEs are separated out from the existing bearer(s) at the AN 160, for example, in response to the D2D alert message sent to the D2D alert message sent in step S707. According to at least one example embodiment, it is the dedicated bearer(s) established in step S709 which are switched to becoming the D2D bearer.

In step S713, the first UE 110A stores in the UE sync FIFO 118 copies of data blocks that have been successfully transmitted to the eNB 120. According to at least one example embodiment, the blocks stored by the first UE 110A in step S713 are copies of blocks, from among the blocks sent from the first UE 110A to the second UE 110B over the dedicated bearer, for which ACKs were received from the eNB 120.

In step S715, the eNB 120 stores copies of data blocks received from the first UE 110A and sent to the SGW 140 via the S1-U link in the eNB sync FIFO 184. A copy of the oldest data block from among the data blocks stored in the eNB sync FIFO 184 may also be held at the UL-DL block sync function 186.

In step S716, network routed communications takes place over the DL path between the CN 180 and the second UE 110B via the dedicated bearer 182.

In step S720, the eNB 120 determines whether UL data 112 and DL data 116 associated with the dedicated bearer 182 is synchronized. In order to determine synchronization, the eNB 120 may check whether the oldest UL data block buffered in the eNB sync FIFO 184 is the same as a DL data block that has arrived at the eNB 120 from the CN 180 for transmission for UE2. If the two data blocks are the same, then the eNB 120 determines that the buffered UL data blocks are aligned with the DL data blocks—they are in sync. According to at least one example embodiment, the synchronization determination takes place only after the dedicated data bearer between the first UE 110A and the second UE 110B is established in step S709.

There are several possible ways to determine whether or not the buffered oldest UL block and the most recent DL block match:

a. As a first possible match detection method, correlation detection may be performed for the oldest stored UL data block(s) with the most recent DL block(s) in the DL PDCP buffer 174. According to at least one example embodiment, the correlation may be performed only with respect to the data portion (i.e., without regard to a header for the PDCP sequencing). Bit-wise correlation (e.g., bit-wise XoR and accumulating the XoR results over the entire data block) or comparison is performed block by block with respect to the oldest UL block in the UL/DL SYNC buffer and a DL block in the DL PDCP buffer 174 about to be transmitted to the second UE 110B. When a correlation peak is obtained, the correlation is detected. The eNB may then determine that the UL data in the eNB buffer is in synch with the DL data blocks.

b. As a second possible match detection method, a new D2D sequence number may be concatenated at the application layer for UL/DL data block synchronization purposes. The synchronization unit will compare the D2D sequence number of the oldest UL block from the eNB sync FIFO 184 with the sequence number of the incoming DL blocks received at the eNB 120 from the CN 180. If a D2D sequence number of one of the DL blocks is the same as the D2D sequence number of the oldest UL block in the eNB sync FIFO 184, the eNB 120 may determine that the UL and DL data blocks are synchronized. The drawback of the instant approach is that a new end-to-end sequence number has to be added to every data block or packet block. Such an operation may result in an undesirably large amount of overhead.

c. As a third possible match detection method, the existing end-to-end packet number already used in the application layer may be reused. Then the packet sequence numbers may be inspected in at the UL/DL synchronization function 186 inspect following the same procedures discussed above with reference to the second match detection method.

In step S722, the eNB sync FIFO 184 is maintained. For example, every time an acknowledgement is received from the second UE 110B for a data block, the data block copy stored in the eNB sync FIFO 184 corresponding to the acknowledged data block may be removed from the eNB sync FIFO 184.

In step S730, the eNB 120 sends a message to the first UE 110A notifying the first UE 110A of a status of the eNB sync FIFO 184. Step S730 may be performed periodically. For example, according to at least one example embodiment, every 20 ms, the oldest UL PDCP block sequence number (or the oldest packet number in above options b. and c. will be sent from the eNB 120 to first UE 110A.

In step S732, the UE sync FIFO 118 is maintained. For example, upon receiving the status of the eNB sync FIFO 184 in step S730, the first UE 110A will clear all the blocks in the UE sync FIFO 118 whose PDCP sequence numbers are older than the sequence number received from the eNB 120 as the status of the eNB sync FIFO 184. Accordingly, the size of the UE sync FIFO 118 may be controlled and the content of the UE sync FIFO 118 may be kept consistent with that of the eNB sync FIFO 182.

According to at least one example embodiment, the D2D preparation state begins with step S734. According to at least one example embodiment, step S734 is performed by the eNB 120 only after the eNB 120 has determined, in step S720, that the UL data 112 and the DL data 116 are in sync. In step S734, after the eNB 120 has decided that a pair of UEs meets D2D proximity and link condition requirements, the eNB 120 transitions from the D2D alert state to D2D preparation state. The eNB 120 decides the portion of the data blocks (e.g. the rest of a packet currently in transmission) to be continued to be transmitted from the eNB 120 to the second UE 110B, and the first data block to be transmitted through D2D. Then the eNB 120 sends a D2D preparation message to notify the first UE 110A to stop network route UE-to-eNB data transmission. The D2D preparation message sent in step S734 also includes sync information for identifying a first data block for D2D transmission. For example the sync information can include the DL PDCP sequence number (or the end-to-end packet number for the first and second match detection methods discussed above) and the UL PDCP sequence number of the data block chosen for initial D2D transmission.

In step S740, the eNB 120 also notifies the CN 180 that the data bearer between the first and second UEs 110A and 110B has been switched to a D2D path and that the current bearer has been reset. The identifiers for the first and second UEs 110A and 110B, and the newly established D2D bearer will be included in the notification. Residual data intended for transmission to the second UE 110B, for example data blocks having sequence numbers falling after the sequence number of the first data block chosen for D2D transmission, may be transmitted to the second UE 110B from the UE sync FIFO 118.

In step S742, in response to receiving the D2D preparation message in step S734, the first UE 110A stops network routed UL transmissions, identifies the first data block to be transmitted over D2D link in accordance with the UL PDCP sequence number (or the packet number) received from the eNB 120 in the D2D preparation message, and resets the UL PDCP layer. The first UE 110A also adopts the DL PDCP sequence numbering as the D2D PDCP sequence numbering, and takes the DL PDCP sequence number received from the eNB 120 in the D2D preparation message as the D2D PDCP sequence number of the first data block to be transmitted using D2D.

In a case where the D2D path is in a different RAT with respect to the network path, re-fragmentation and re-numbering that follows the RAT protocol of the previous network path may be performed first at the first UE 110A. The second UE 110B will determine the sequence number, N_suc, of the last successfully received block. The new sequence number N_suc will be sent from the second UE 110B to the eNB 120, and the eNB 120 will forward the sequence number N_suc to the first UE 110A. The first UE 110A will perform re-numbering and use N_suc+1 as the sequence number of the first block to be transmitted using D2D.

In step S744, upon receiving the ACK from the second UE 110B for the last residual block delivered from the eNB 120 to second UE 110B, the eNB 120 transits from the D2D preparation state 785 to the D2D operation state 790. In step S744, the eNB 120 sends D2D starting messages or D2D scheduling messages to the UEs participating in D2D communications, the first and second UEs 110A and 110B.

In step S748, after receiving the starting-D2D message or D2D scheduling message (in the case of strict network control), the first UE 110A begins transmitting data to the second UE 110B over the D2D link.

As is stated above, with respect to any pair of UEs described herein as participating in either D2D or network routed communications, either UE of the pair may operate as both a transmitting UE and a receiving UE with respect to the other UE in the pair. Accordingly, though in the examples explained above with reference to FIGS. 5-7, the first UE 110A is described from the perspective of a transmitting UE and the second UE 110B is described from the perspective of a receiving UE, the second UE 110B is capable of performing all the transmitting UE functions discussed above as being performed by the first UE 110A, and the first UE 110A is capable of performing all the receiving UE functions discussed above as being performed by the second UE 110B.

According to the methods for facilitating network-to-D2D route switching explained above with reference to FIGS. 6 and 7, switching between D2D routed communication and network routed communication may be accomplished while reducing or minimizing an amount of data loss and delay caused by the switch.

Example embodiments being thus described, it will be obvious that embodiments may be varied in many ways. Such variations are not to be regarded as a departure from example embodiments, and all such modifications are intended to be included within the scope of example embodiments.

What is claimed:

1. A method of facilitating path switching, for a communication path between a first user equipment (UE) and a second UE, from a device to device (D2D) path to network path, the method comprising:
   receiving, at an access network, switch point information from the first UE, the switch point information identifying a last data block sent from the first UE to the second UE over the D2D path;
   establishing, at the access network, a connection with the first UE over an uplink path between the first UE and the access network;
   establishing, at the access network, a connection with the second UE over a downlink path between the access network and the second UE;
   setting, at the access network, a data block sequencing numbering to be the same for the uplink path and the downlink path based on the switch point information; and
   forwarding, at the access network, data from the first UE to the second UE via the network path, the network path including the uplink path and the downlink path.

2. The method of claim 1, further comprising:
   receiving, at the access network, a lost data message from the second UE identifying data blocks which the second UE has determined were lost in transmission over the D2D path between the first UE and the second UE;

sending, from the access network, a data retrieval message to the first UE, the data retrieval message instructing the first UE to forward the data blocks identified as being lost to the access network;

receiving, from the first UE, the data blocks identified as being lost; and sending the data blocks identified as being lost from the access network to the second UE over the downlink path.

3. The method of claim 1, further comprising:

determining, at the access network; a signal quality of transmission between the first UE and the second UE on the D2D path; and sending a message to the first UE instructing the first UE to stop data transmission to the second UE over the D2D path based on the determined signal quality.

4. A method of performing path switching, for a communication path between a first user equipment (UE) and a second UE, from a device to device (D2D) path to network path, the method comprising:

receiving, at the first UE, a first message from an access network;

stopping, at the first UE, data transmission to the second UE through the D2D path, in response to the first message;

determining a last data block sent from the first UE to the second UE based on contents of a transmission buffer at the first UE;

sending, from the first UE, switch point information to the access network, the switch point information identifying the last data block;

establishing, at the first UE, a connection with the access network over an uplink path between the first UE and the access network; and sending data from the first UE to the second UE over the network path, the network path including the uplink path to the access network.

5. A method of facilitating path switching, for a communication path between a first user equipment (UE) and a second UE, from a network path to a device to device (D2D) path, the method comprising:

receiving, at an access network, a stream of uplink data blocks sent from the first UE to the second UE on an uplink path between the first UE and the access network;

storing, in a buffer at the access network, data blocks from the stream of uplink data blocks;

sending, from the access network, a stream of downlink data blocks on a downlink path between the access network and the second UE, the stream of downlink data blocks being blocks sent from the first UE to the second UE;

determining, at the access network, whether the stream of uplink blocks is synchronized with the stream of downlink blocks based on an oldest data block stored in the buffer which has not yet been received at the second UE and a data block from the stream of downlink data blocks; and based on the determination, sending a D2D preparation message from the access network to the first UE, the D2D preparation message identifying an initial data block for the first UE to send over the D2D path.

6. The method of claim 5, wherein the D2D preparation message further includes a sequencing numbering indication indicating a data block sequencing numbering used by the access network for the stream of downlink data blocks sent on the downlink path.

7. The method of claim 5, further comprising:

before sending the D2D preparation message, establishing, at the access network, at least one dedicated data bearer for at least one stream of uplink data blocks received from the first UE on the uplink path and the stream of downlink data blocks sent to the second UE on the downlink path, the at least one dedicated data bearer separating the stream of uplink data blocks and the stream of downlink data blocks out from data blocks of other streams being sent from the first UE or received at the second UE.

8. A method of performing path switching, for a communication path between a first user equipment (UE) and a second UE, from a network path to a device to device (D2D) path, the method comprising:

sending, from the first UE, a stream of uplink data blocks to the second UE through an uplink path from the first UE to an access network;

receiving, at the first UE, a first message from the access network;

storing, in a buffer at the first UE, copies of blocks from the stream of uplink data which have been acknowledged by the access network as being received, in response to the first message;

receiving, at the first UE, a synchronization buffer status message from the access network;

synchronizing the buffer at the first UE with a UL or DL synchronization buffer at the access network by removing data blocks from the buffer at the first UE based on the synchronization buffer status message;

receiving, at the first UE, a D2D preparation message from the access network, the D2D preparation message identifying a first data block;

selecting, as an initial data block to send to the second UE over the D2D path, the first data block identified by the D2D preparation message; and sending a stream of D2D data blocks to the second UE over the D2D path, the stream of D2D data blocks beginning with the identified first block.

9. The method of 8, wherein the D2D preparation message includes a sequencing numbering indication indicating a data block sequencing numbering used for blocks transmitted on a downlink path between the access network and the second UE, the downlink path being the path used to deliver the blocks in the stream of uplink data blocks from the access network to the second UE, and wherein sending the stream of D2D data blocks includes,
setting, at the first UE, a data block sequencing numbering of the stream of D2D blocks based on the sequencing numbering indication, and
including, in the stream of D2D blocks, data blocks stored in the buffer having sequence numbers newer than a sequence number of the identified first block.

10. The method of 8, further comprising:

receiving, at the first UE, a bearer message indicating to the mobile that a dedicated bearer has been established at the access network, before sending the stream of uplink data blocks to the second UE, wherein the sending the stream of uplink data blocks from the first UE to the second UE includes sending the stream of uplink data blocks to the second UE through the uplink path using the dedicated bearer.

11. A network element comprising:

a processor;

a memory device storing instructions that, when executed by the processor cause the processor to control operations for facilitating path switching, for a communication path between a first user equipment (UE) and a second UE, from a device to device (D2D) path to network path, the operations including, receiving, at the network element, switch point information from the first UE, the switch point information identifying a last data block that has been sent from the first UE to the second UE over the D2D path;

establishing, at the network element, a connection with the first UE over an uplink path between the first UE and the network element;

establishing, at the network element, a connection with the second UE over a downlink path between the network element and the second UE;

setting, at the network element, a data block sequencing numbering to be the same for the uplink path and the downlink path based on the switch point information; and forwarding, at the network element, data from the first UE to the second UE via the network path, the network path including the uplink path and the downlink path.

12. The network element of claim 11, wherein the processor is further configured to control operations including, receiving, at the network element, a lost data message from the second UE identifying data blocks which the second UE has determined were lost in transmission over the D2D path between the first UE and the second UE;

sending, from the network element, a data retrieval message to the first UE, the data retrieval message instructing the first UE to forward the data blocks identified as being lost to the network element;

receiving, from the first UE, the data blocks identified as being lost; and sending the data blocks identified as being lost from the network element to the second UE over the downlink path.

13. The method of claim 11, wherein the processor is further configured to control operations including, determining, at the network element; a signal quality of transmission between the first UE and the second UE on the D2D path; and sending a message to the first UE instructing the first UE to stop data transmission to the second UE over the D2D path based on the determined signal quality.

14. A mobile device comprising:

a processor;

a memory device storing instructions that, when executed by the processor cause the processor to control operations for performing path switching, for a communication path between the mobile device and a user equipment (UE), from a device to device (D2D) path to network path, the operations including, receiving, at the mobile device, a first message from an access network;

stopping, at the mobile device, data transmission to the UE through the D2D path, in response to the first message;

determining a last data block sent from the mobile device to the UE based on contents of a transmission buffer at the mobile device;

sending, from the mobile device, switch point information to the access network, the switch point information identifying the last data block;

establishing, at the mobile device, a connection with the access network over an uplink path between the mobile device and the access network, and sending data from the mobile device to the UE over the network path, the network path including the uplink path to the access network.

15. A network element comprising:

a processor;

a memory device storing instructions that, when executed by the processor cause the processor to control operations for facilitating path switching, for a communication path between a first user equipment (UE) and a second UE, from a network path to a device to device (D2D) path, the operations including, receiving, at the network element, a stream of uplink data blocks sent from the first UE to the second UE on an uplink path between the first UE and the network element;

storing, in a buffer at the network element, data blocks from the stream of uplink data blocks;

sending, from the network element, a stream of downlink data blocks on a downlink path between the network element and the second UE, the stream of downlink data blocks being blocks sent from the first UE to the second UE;

determining, at the network element, whether the stream of uplink blocks is synchronized with the stream of downlink blocks based on an oldest data block stored in the buffer which has not yet been received at the second UE and a data block from the stream of downlink data blocks; and based on the determination, sending a D2D preparation message from the network element to the first UE, the D2D preparation message identifying an initial data block for the first UE to send over the D2D path.

16. The network element of claim 15, wherein the D2D preparation message further includes a sequencing numbering indication indicating a data block sequencing numbering used by the network element for the stream of downlink data blocks sent on the downlink path.

17. The network element of claim 15, wherein the processor is further configured to control operations including, establishing, at the network element, a dedicated data bearer for the stream of uplink data blocks received from the first UE on the uplink path and the stream of downlink data blocks sent to the second UE on the downlink path.

18. A mobile device comprising:

a processor;

a memory device storing instructions that, when executed by the processor cause the processor to control operations for performing path switching, for a communication path between the mobile device and a user equipment (UE), from a network path to a device to device (D2D) path, the operations including, through an uplink path from the mobile device to an access network;

receiving, at the mobile device, a first message from the access network;

storing, in a buffer at the mobile device, copies of blocks from the stream of uplink data which have been acknowledged by the access network as being received, in response to the first message;

receiving, at the mobile device, a synchronization buffer status message from the access network;

synchronizing the buffer at the mobile device with a UL or DL synchronization buffer at the access network by removing old data blocks from the buffer at the mobile device based on the synchronization buffer status message;

receiving, at the mobile device, a D2D preparation message from the access network, the D2D preparation message identifying a first data block;

selecting, as an initial data block to send to the UE over the D2D path, the first data block identified by the D2D preparation message; and sending a stream of D2D data blocks to the UE over the D2D path, the stream of D2D data blocks beginning with the identified first block.

19. The mobile device of 18, wherein the D2D preparation message includes a sequencing numbering indication indicating a data block sequencing numbering used for blocks transmitted on a downlink path between the access network and the UE, the downlink path being the path used to deliver the blocks in the stream of uplink data blocks from the access network to the UE, and wherein sending the stream of D2D data blocks includes,
setting, at the mobile device, a data block sequencing numbering of the stream of D2D blocks based on the sequencing numbering indication, and
including, in the stream of D2D blocks, data blocks stored in the buffer having sequence numbers newer than a sequence number of the identified first block.

20. The mobile device of 18, wherein the processor is further configured to control operations including, receiving, at the mobile device, a bearer message indicating to the mobile that a dedicated bearer has been established at the access network before sending the stream of uplink data blocks to the UE, wherein the sending the stream of uplink data blocks from the mobile device to the UE includes sending the stream of uplink data blocks to the UE through the uplink path using the dedicated bearer.

* * * * *